United States Patent [19]

Gatens

[11] Patent Number: 4,723,804
[45] Date of Patent: Feb. 9, 1988

[54] LUBRICATED ROTATABLE LOG COUPLING FOR HAULBACK LINE AND CHOKER

[76] Inventor: Tom Gatens, Rte. 2, Box 25, Seal Rock, Oreg. 97376

[21] Appl. No.: 835,103

[22] Filed: Feb. 28, 1986

[51] Int. Cl.⁴ .................... B66C 1/34; F16D 1/12
[52] U.S. Cl. .................... 294/82.11; 403/78; 403/165
[58] Field of Search ............ 294/1.1, 74, 82.1, 82.11, 294/82.14; 24/230.5 R; 403/60, 78, 165, 353

[56] References Cited

U.S. PATENT DOCUMENTS

| | | | |
|---|---|---|---|
| 1,454,587 | 5/1923 | Gunn | 294/82.1 X |
| 1,464,161 | 8/1923 | Wirkkala | 294/74 |
| 1,507,960 | 9/1924 | Heinzinger | 294/82.11 X |
| 1,666,272 | 4/1928 | Spiering | 403/353 |
| 1,786,081 | 12/1930 | Nourse | 403/165 |
| 1,806,469 | 5/1931 | Koons | 294/82.1 |
| 2,759,234 | 8/1956 | Brawand | 294/82.11 X |
| 2,803,486 | 8/1957 | Larson et al. | 294/82.11 |
| 2,811,378 | 10/1957 | Kalista | 403/78 X |
| 2,815,976 | 12/1957 | Hammit | 294/82.15 |
| 2,955,855 | 10/1960 | Jobbins | 294/1.1 X |
| 3,544,142 | 12/1970 | Moss | 403/78 |
| 4,185,863 | 1/1980 | Larson et al. | 294/82.14 |
| 4,600,331 | 7/1986 | Gray | 403/165 |

FOREIGN PATENT DOCUMENTS

| | | | |
|---|---|---|---|
| 1041997 | 10/1958 | Fed. Rep. of Germany | 294/82.1 |
| 920416 | 4/1947 | France | 294/82.1 |

Primary Examiner—Johnny D. Cherry
Attorney, Agent, or Firm—Klarquist, Sparkman, Campbell, Leigh & Whinston

[57] ABSTRACT

A rotatable coupling is provided for connecting the haulback line ferrule of a cable yarding system to cable chokers. The coupling includes a top member and a bottom member rotatably joined along a pair of opposing flat faces which abut each other and allow rotation about only one axis. A slot in the top member includes a wide bottom cavity and a narrow top cavity which meet to form an annular shoulder against which a top face of the ferrule seats. A stop formed by the sidewall of the top member obstructs radial movement of the ferrule out of the bottom cavity when the top face of the ferrule abuts the shoulder. A lock bolt selectively supports the ferrule against the shoulder. A log bundle carried by cable chokers rotates freely with the bottom member while the top member remains stationary. The coupling thereby prevents torsional forces from being introduced into the cable by rotation of the log bundle.

8 Claims, 6 Drawing Figures

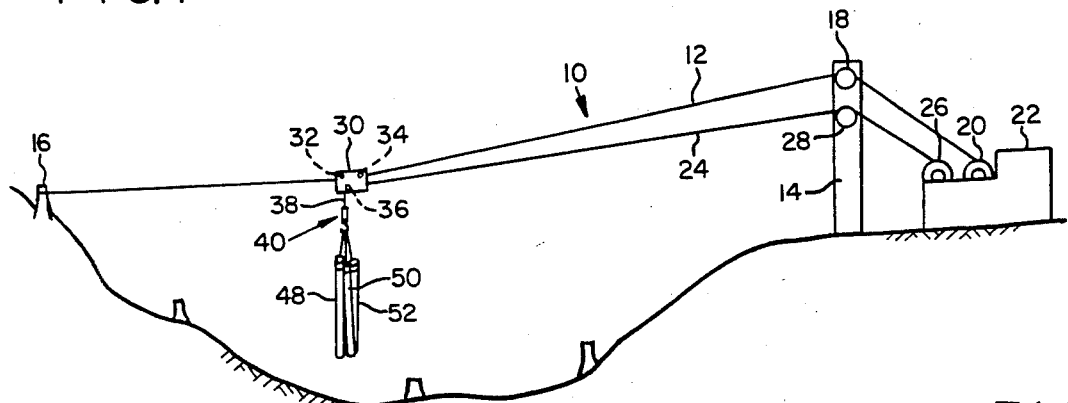
FIG. 1
FIG. 1A
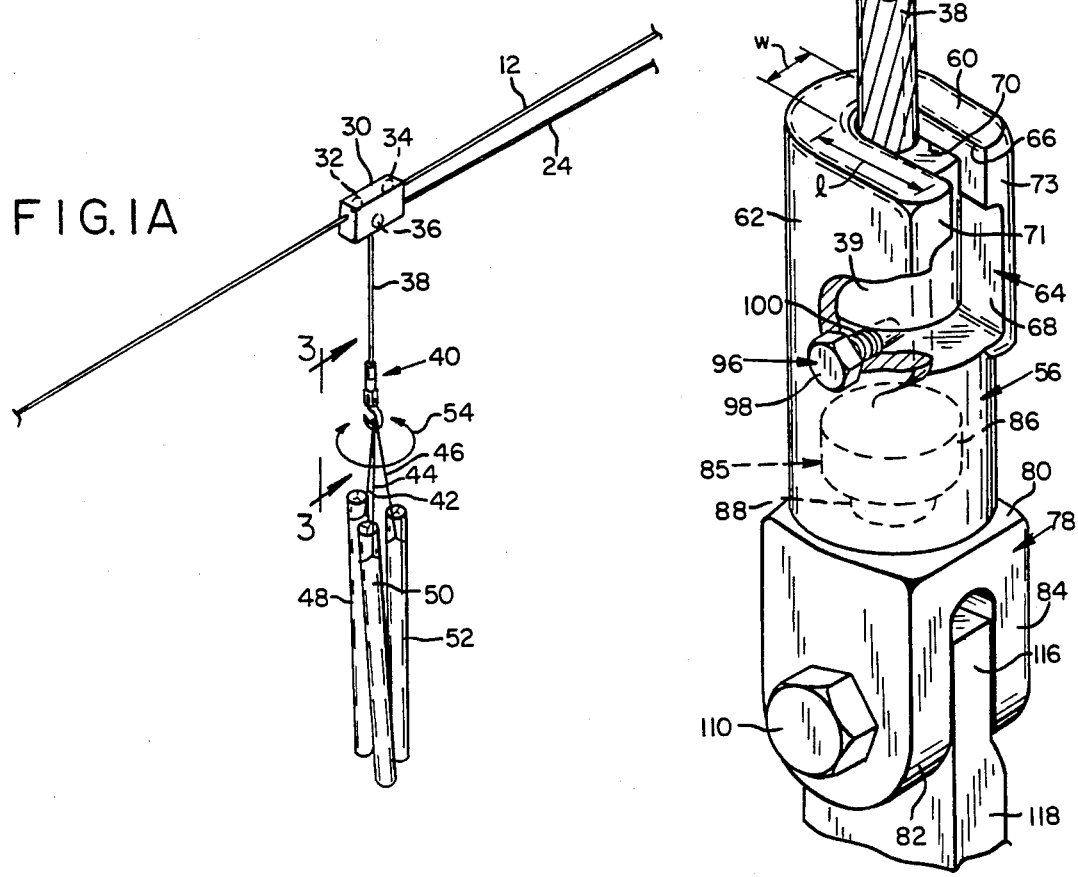
FIG. 2

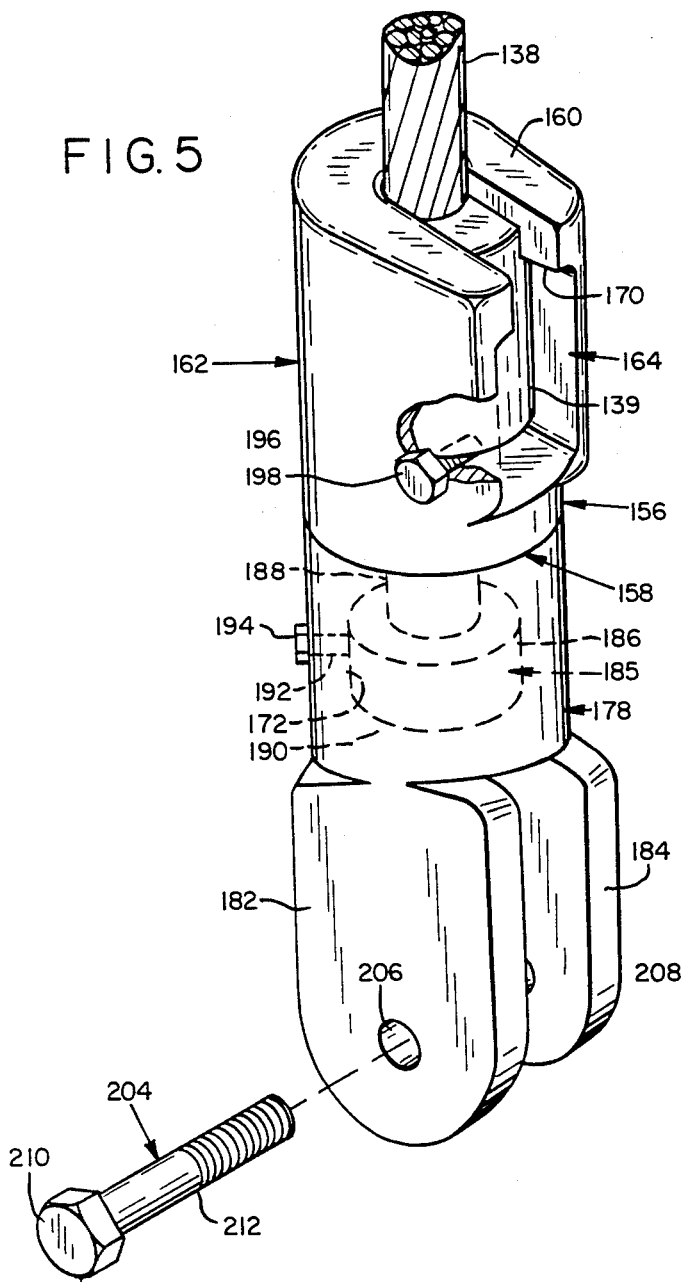
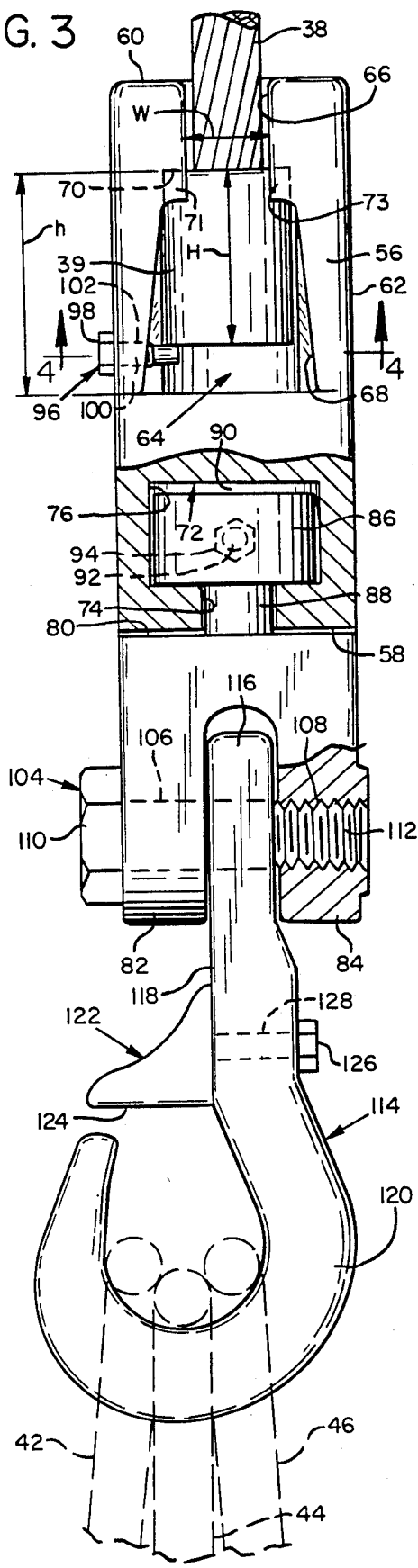
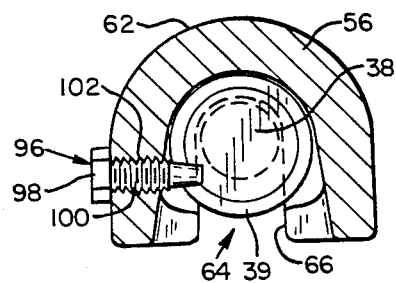

4,723,804

LUBRICATED ROTATABLE LOG COUPLING FOR HAULBACK LINE AND CHOKER

BACKGROUND OF THE INVENTION

1. Field of the Invention

This invention concerns a rotatable coupling for suspending heavy items from a cable without introducing torsional stresses into the cable when the heavy item rotates. More particularly, this invention concerns a rotatable log coupling for placement between a cable yarding haulback line and choker.

2. General Discussion of the Background

It is common practice in the logging industry to use a cable yarding system to transport cut logs over rough terrain. Such a yarding system often comprises a skyline cable suspended between a yarder tower and a stationary structure, such as a tree or tree stump. A remote control carriage rides along the skyline cable on sheaves, and a haulback cable is suspended between the carriage and yarder. The haulback cable is placed over a pulley in the carriage, and a free end of the cable is suspended from the carriage. The free end of the cable is typically provided with a hook and a plurality of chokers for attachment to logs that are to be transported. After the chokers are placed around felled trees and tightened, tension is exerted on the haulback line by the yarder to raise the felled trees above the ground. The carriage is then moved along the skyline to transport the logs over the terrain to a desired destination.

The log bundle carried by the choker imposes an eccentric load on the haulback cable from which it is suspended, resulting in rotation of the log bundle and haulback cable. This rotation in turn imposes torsional stresses within the cable that fray it. The structural integrity and strength of the cable is thereby diminished, requiring frequent replacement of the cable.

U.S. Pat. No. 2,759,234 to Brawand illustrates an early attempt to provide a rotatable log coupling which could drag logs along the ground with a cable. The Brawand coupling comprises an upper eye and a lower eye, the upper eye being attached through a swivel attachment to a main cable and haulback line. The choker is removably connected to the coupling by a ferrule which is inserted in a slot within the lower eye. Although this coupling is suitable for hauling logs across uneven ground, it is less suitable when logs are suspended in the air before being transported. Once the logs are suspended in the air, the top and bottom eyes of the coupling are free to move relative to one another, therefore allowing the suspended logs to swing like a pendulum around a horizontal axis.

U.S. Pat. Nos. 1,464,161 and 1,786,081 and 4,185,863 also disclose various rigging fittings in which a pair of ferrules are hooked into a fitting to provide a swivel connection. Use of so many ferrules is clumsy and can also be dangerous since the ferrules can become disengaged from the couplings to break the connection.

Finally, U.S. Pat. No. 2,955,855 shows a shackle for carrying a control rod in a nuclear reactor. The shackle is supported from a flexible lifting cable having a ferrule retained in a chamber in the shackle. This shackle is a unitary fixture which is not free to rotate about a vertical axis. Although it is possible that the shackle might rotate relative to the cable and ferrule from which it is suspended, frictional engagement between the ferrule and shackle would greatly limit free rotation.

It is accordingly an important object of this invention to provide a rotatable log coupling for placement between an elevated haulback line and shackle to prevent introduction of torsional stresses into the haulback line when the elevated log bundle rotates about a vertical axis.

Another important object of the invention is to provide such a rotatable coupling comprised of two portions which are free to rotate relative to each other about a vertical axis, but are not otherwise free to move relative to one another about a horizontal axis.

Yet another important object is to provide a coupling that uses only one ferrule attachment, and in which the ferrule is tightly retained within the coupling without danger of it being accidentally dislodged.

Finally, it is an important object of the invention to provide such a rotatable coupling that is suitable for use with a cable yarding operation wherein logs are elevated off the ground before being hauled to a yard.

The foregoing and other objects, features, and advantages of the invention will become more apparent from the following detailed description of preferred embodiments which proceeds with reference to the accompanying drawings.

SUMMARY OF THE INVENTION

The aforementioned objects are achieved by providing a rotatable log coupling comprising a substantially cylindrical top member and a bottom member, the top and bottom members being rotatable relative to one another. The top member has an upper face and a flat lower face, a sidewall, and a slot through a portion of the sidewall and upper face for retaining a cylindrical ferrule at the end of a cable. The bottom member has a flat upper face and depending clevis, the top and bottom members being joined rotatably to one another along their flat faces.

The horizontal cross-sectional area of the slot decreases in the direction of the upper face. The slot comprises a greater cross-sectional area lower cavity and a reduced cross-sectional area upper cavity. An annular interior shoulder is formed at the intersection of the upper and lower cavities to provide a surface against which the top face of the ferrule rests when upward force is exerted on the cable.

A lock bolt extends through the side wall of the top member into the lower cavity below the ferrule to hold the top face of the ferrule tightly against the shoulder. A pin is carried by the clevis, and a hook is attached to the pin from which are suspended a plurality of log chokers.

The coupling is used in preferred embodiments to interconnect a haulback line and log chokers. The ferrule of the haulback line is retained within the lower cavity of the coupling's top member, and the chokers are carried by the hook suspended from the clevis pin. The bottom member is free to rotate relative to the top member about a vertical axis, while relative rotation about a horizontal axis is prevented by the flat faces along which the members are joined.

BRIEF DESCRIPTION OF THE DRAWINGS

The invention will be better understood from the following description taken in connection with the accompanying drawings in which:

FIG. 1 is a schematic view of a cable yarding system incorporating the present invention.

FIG. 1A is an enlarged, perspective view of the cable yarding carriage and choker assembly incorporating the present invention.

FIG. 2 is a fragmentary enlarged, perspective view of the rotatable log coupling, parts of the wall of the upper member being broken away, the joining means shown in phantom.

FIG. 3 is an enlarged, side elevational view taken along line 3—3 of FIG. 1A, portions of the coupling being broken away to illustrate the joining means, obscured parts being shown in phantom.

FIG. 4 is a cross-sectional view along lines 4—4 of FIG. 3.

FIG. 5 is a perspective view of a second embodiment of the coupling, the joining means being shown in phantom, portions of the top member being broken away to illustrate the relationship of a retaining bolt beneath a ferrule.

DETAILED DESCRIPTION OF PREFERRED EMBODIMENTS

Cable Yarding System

A conventional cable yarding system 10 is shown in FIG. 1 to include a skyline 12 suspended between a yarder 14 and tree trunk 16. Skyline 12 loops over a pulley 18 on yarder 14, and extends from the pulley to a drum 20 which is rotatably mounted on a platform 22 having power rotary means (not shown) for rotating drum 20. A haulback line 24 is attached to a haulback drum 26, loops over haulback pulley 28, and extends generally parallel and adjacent to skyline 12 until it reaches carriage 30. The carriage 30 rides along skyline 12 on a pair of carriage sheaves 32, 34. The carriage 30 also includes a suspension sheave 36 over which haulback line 24 is suspended to present a downwardly depending portion 38 of haulback line 24. A cylindrical ferrule 39 (FIGS. 2 and 3) is secured to the free end of portion 38, the ferrule having a circular flat upper face, a circular flat lower face, and a sidewall.

Rotatable Coupling

Portion 38 of haulback line 24 is connected through a rotatable coupling 40 to chokers 42, 44, 46 which are looped around logs 48, 50, 52, respectively. Cable yarding system 10 is used to transport logs 48–52 from their remote position shown in FIG. 1 to a position adjacent yarder 14. This transportation is achieved by first attaching chokers 42-46 to the logs, then elevating them off the ground to the postion shown in FIGS. 1 and 1A. Haulback line 24 is next reeled in, and then carriage 30 moves along skyline 12 in the direction of yarder 14.

Logs 48-52 are typically of slightly different diameters and lengths. The logs are retained by chokers 42-46 in such a way that an uneven distribution of weight in the bundle of logs produces an eccentric load that tends to rotate the log bundle as illustrated by arrow 54 (FIG. 1A). Coupling 40 of the present invention permits the log bundle to rotate freely about a vertical axis without introducing torsional stresses into cable 24, thereby prolonging the useful life of the haulback cable.

As seen best in FIGS. 2 and 3, coupling 40 comprises a substantially cylindrical top member 56 having a flat lower face 58, flat upper face 60, a sidewall 62, and a slot 64 through a top portion of sidewall 62 and upper face 60. Slot 64 comprises an upper cavity 66 and lower cavity 68, the upper cavity having a generally constant U-shaped horizontal cross-sectional area, and the lower cavity having a greater, generally semicircular horizontal cross-sectional area. The walls of lower cavity 68 taper slightly in the direction of upper chamber 66 such that chamber 68 is substantially frustoconical in vertical section. The length 1 and width w (FIG. 2) of the cross-sectional area of upper cavity 66 are substantially less than the corresponding dimensions of lower cavity 68, such that a flat annular interior shoulder 70 is formed between the cavities. The width w of cavity 66 is slightly greater than the diameter of cable portion 38 so that portion 38 can slide into cavity 66.

Sidewall 62 forms a pair of stops 71, 73 that extend below shoulder 70 and form an enclosure for ferrule 39 that prevents the ferrule from moving radially out of the slot after the ferrule is lifted by cable portion 39 into abutting engagement with shoulder 70. The vertical height h (FIG. 3) of lower cavity 68 is greater than the vertical height H of ferrule 39, and the horizontal sectional area of cavity 68 tapers from a bottom horizontal width greater than the diameter of ferrule 39 to a top horizontal width substantially identical to the diameter of ferrule 39. This arrangement allows cable portion 38 to be attached to coupling 40 by moving ferrule 39 into cavity 68 below stops 71, 73 with cable portion 38 sliding into cavity 66. Once cable portion 38 exerts an upward force on ferrule 39, the top face of the ferrule abuts shoulder 70 and stops 71, 73 prevent the ferrule from moving out of slot 64.

Top member 56 defines a knob receiving chamber 72 adjacent its lower end, the chamber 72 including a small diameter cylindrical stem chamber 74 communicating with lower face 58, and a large diameter cylindrical chamber 76 above stem chamber 74.

Coupling 40 also includes a bottom member 78 having a flat upper face 80 and a depending clevis comprising clevis arms 82, 84. A knob 85 is integrally formed with bottom member 78 and protrudes upwardly from flat upper face 80. The knob includes an enlarged head 86 and reduced diameter stem 88. The dimensions of head 86 are substantially the same but slightly less than the dimensions of chamber 76, and the dimensions of stem 88 are substantially the same but slightly less than chamber 74. The top and bottom members 56, 78 can therefore be joined rotatably to one another along their flat faces 58, 80 by retention of knob 85 within chamber 72. With members 56, 78 joined in this fashion, faces 58, 80 abut one another in a supporting relationship that allows members 56, 78 to rotate relative to one another about a vertical axis but prevents relative rotational movement about a horizontal axis.

In the disclosed embodiment, chamber 72 is filled with oil 90 to provide a lubricating medium in which head 86 and stem 88 rotate. An inlet port 92 extends through sidewall 62 of top member 56 and communicates with chamber 72 for replenishing the supply of oil within chamber 72. A removable plug, such as externally threaded plug 94, engages internal threads in inlet port 92 to close the port.

A lock bolt 96 through sidewall 62 of top member 56 selectively retains ferrule 39 within slot 64 by supporting the ferrule from beneath and holding its top face in fixed engagement against annular shoulder 70. Lock bolt 96 includes an enlarged head 98 and threaded shank 100 which extends through an internally threaded bore 102. Shank 100 projects into slot 64 at a distance H (FIG. 3) below shoulder 70 to support the bottom face of ferrule 39 when the top face of the ferrule is held in very tight engagement against shoulder 70. In this manner, the ferrule is positively retained within slot 64 by bolt 96 and stops 71, 73.

A pin 104 extends through aligned cylindrical bores 106, 108 (FIG. 3) of clevis arms 82, 84. Pin 104 includes an enlarged, hexagonal head 110 and an externally threaded shank 112, the external threads of shank 112 mating with internal threads of bore 108 selectively to fix the pin in bores 106, 108.

A hook 114 is carried by pin 104. Hook 114 includes an eye 116 through which shank 112 extends, a shank 118, and a bight 120 over which chokers 42–46 are looped. A closure member 122 closes the opening between bight 120 and shank 118 once chokers 42–46 have been looped over bight 120. Closure member 122 comprises a generally triangular cross section stop 124 that can be rotated by movement of nut 126 and its attached shank 128. Stop 124 is shown in its closed position in FIG. 3, but can be inverted to its open position by rotating nut 126 180°. When stop 124 is inverted to its open position, enough clearance is provided between stop 124 and bight 120 to permit chokers 42, 46 to move on and off hook 114.

Alternate Embodiment

A second embodiment of the rotatable log coupling is shown in FIG. 5. This embodiment is similar to that shown in FIGS. 2–4 and like parts have been given like reference numerals plus 100. The embodiment of FIG. 5 differs from that shown in FIGS. 2–4 in that the knob 186 projects downwardly from lower face 158 of top member 162 instead of upwardly from the bottom member. The bottom member 178 also defines a knob receiving chamber 172 therewithin, the knob receiving chamber 172 having a shape complementary to head 186 and shank 188 of knob 185 such that upper and lower members 162, 178 can be rotatably joined along their flat common faces as in the earlier embodiment. Chamber 172 is filled with oil 190 to provide a lubricating medium, and an oil port 192 extends through lower member 178. Port 192 is selectively closed with plug 194.

Method of Operation

The following method of operation will be described in connection with the embodiment of the coupling shown in FIGS. 2–4. It will be understood that the same method of operation can be followed in the embodiment of FIG. 5 by substituting analogous parts for those discussed below.

Carriage 30 is provided with a conventional remote control power means (not shown) which allows carriage 30 to travel along skyline 12 to a position above felled logs on the ground. Haulback drum 26 is then rotated to unwind some of haulback line 24 and extend the length of suspension portion 38 until ferrule 39 nears the ground. Ferrule 39 is then inserted in chamber 64 by aligning the bottom face of ferrule 39 with the floor of cavity 64, then moving the ferrule into chamber 64 and cable 38 into chamber 66. Once the sidewall of ferrule 39 is firmly engaged against the closed back wall of slot 64, ferrule 39 is moved upwardly in cavity 66 until the top face of ferrule 39 engages shoulder 70. Lock bolt 96 is then threaded through bore 102 until it projects in supporting engagement below the bottom face of ferrule 39. The ferrule is thereby firmly retained within chamber 68 by bolt 96 and stops 71, 73.

Closure member 122 is rotated from its closed position shown in FIG. 3 to an inverted open position by rotating nut 126 through 180° with a wrench. Chokers 42, 44, and 46 are then looped onto bight 120 of hook 114 and nut 126 is then rotated 180° to return closure member 122 to the position shown in FIG. 3. The chokers are next attached to logs in a conventional manner, and haulback drum 26 is rotated to begin reeling in haulback line 24 and lift logs 48–52 off the ground towards carriage 30. The carriage then moves along skyline 12 toward yarder 14.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. A rotatable log coupling for attachment to a cable having a cylindrical ferrule with top and bottom faces, the coupling comprising:
   a substantially cylindrical to pmember having a flat lower face, an upper face, a sidewall, a slot through a portion of the sidewall and upper face for receiving the ferrule, a shoulder in the slot for providing a surface against which the top face of the ferrule can seat, and stopping means between the shoulder and the portion of the sidewall through which the slot passes for preventing the ferrule from sliding radially when the top face of the ferrule abuts the shoulder;
   a bottom member having a flat upper face and depending clevis, one of said lower face of said top member and upper face of said bottom member being solid;
   bearingless joining means for joining the top and bottom members rotatably to one another with their flat faces abutting;
   a lock bolt means through the side wall of the top member for selectively retaining the top face of the ferrule in abutting relationship against the shoulder; and
   a pin carried by the clevis for attaching a hook.

2. The rotatable log coupling of claim 1 wherein the joining means comprises:
   a knob protruding from the flat lower face of the top member, said lower face being solid;
   a knob receiving chamber defined by the bottom member and communicating with the flat upper face of the bottom member, the chamber having a shape complementary to the shape of the knob, the knob being held in rotating engagement within the chamber; and
   a lubricating medium in the chamber.

3. The rotatable log coupling of claim 2 wherein the lubricating medium is oil and the coupling further comprises:
   an inlet port communicating with the chamber; and
   a removable plug for selectively closing the inlet opening.

4. The rotatable log coupling of claim 3 further comprising a hook carried by the bottom member for attachment to carrying cables.

5. The rotatable log coupling of claim 4 wherein the cable to which the ferrule is attached is a haulback cable from an elevated carriage suspended from a skyline.

6. The rotatable log coupling of claim 1 wherein the joining means comprises:
   a knob protruding from the flat upper face of the bottom member;

a knob receiving chamber defined by the top member and communicating with the flat lower face of the top member, the chamber having a shape complementary to the shape of the knob, the knob being held in rotating engagement within the chamber; and a liquid lubricating medium in the chamber.

7. A rotatable log coupling for attachment to a cable having a cylindrical ferrule with top and bottom faces, the coupling comprising:

a substantially cylindrical top member having a solid flat lower face, an upper face, a sidewall, a knob protruding from the lower face, and a slot through a portion of the sidewall and upper face for retaining the ferrule at the end of a haulback cable which is suspended from an elevated carriage, the slot being comprised of a top cavity and a bottom cavity, the bottom cavity having a height greater than the height of the ferrule and a width at least substantially the same as the diameter of the ferrule, the top cavity being wider than the diameter of the cable but narrower than the diameter of the ferrule, an internal annular shoulder between the top and bottom cavities against which a face of the ferrule seats, and a pair of stopping means between the shoulder and the portion of the sidewall through which the slot passes for preventing the ferrule from sliding radially when the top face of the ferrule abuts the shoulder;

a bottom member having a flat upper face and depending clevis, the bottom defining a knob-receiving chamber communication with the flat upper face, the chamber having a shape complementary to the knob;

the top and bottom members being joined rotatably without bearings to one another along their flat faces with the knob retained within the chamber and flat surfaces abutting each other;

oil within the chamber to provide a lubricating medium in which the knob rotates;

an oil inlet port which communicates with the chamber, and a removable plug for selectively closing the oil inlet port;

a lock bolt means through the sidewall of the top member for selectively retaining the ferrule within the slot by supporting the ferrule from beneath to hold the top face of the ferrule in abutting engagement against the shoulder; and a pin carried by the clevis, a hook carried by the pin, and a plurality of log-carying cables looped over the hook.

8. A rotatable log coupling for attachment to a cable having a cylindrical ferrule with top and bottom faces, the coupling comprising:

a substantially cylindrical top member having a flat lower face, an upper face, a sidewall, and a slot through a portion of the sidewall and upper face for retaining the ferrule at the end of a haulback cable suspended from an elevated carriage, the slot being comprised of a top cavity and a bottom cavity, the bottom cavity having a height greater than the height of the ferrule and a width at least substantially the same as the diameter of the ferrule, the top cavity being wider than the diameter of the cable but narrower than the diameter of the ferrule, an internal annular shoulder between the top and bottom cavities against which the top face of the ferrule seats, and a pair of stopping means between the shoulder and the portion of the sidewall through which the slot passes for preventing the ferrule from sliding radially when the top face of the ferrule abuts the shoulder, the top member also defining a knob receiving chamber communication with the flat lower face of the top member;

a bottom member having a flat upper face, a depending clevis, and a knob protruding from the flat upper face, the know having a shape complementary to the chamber;

the top and bottom members being joined rotatably without bearings to one another along their flat faces with the knob retained within the chamber and the flat faces abutting each other;

oil within the chamber to provide a lubricating medium in which the knob rotates;

an oil inlet port which communicates with the chamber, and a removable plug for selectively closing the oil inlet port;

a lock bolt means through the sidewall of the top member for selectively retaining the ferrule within the slot by supporting the ferrule from beneath to hold the top face of the ferrule in abutting engagement against the shoulder; and a pin carried by the clevis, a hook carried by the pin, and a plurality of log-carrying cables looped over the hook.

* * * * *

UNITED STATES PATENT AND TRADEMARK OFFICE
CERTIFICATE OF CORRECTION

PATENT NO. : 4,723,804

DATED : February 9, 1988

INVENTOR(S) : Tom Gatens

It is certified that error appears in the above-identified patent and that said Letters Patent is hereby corrected as shown below:

Column 6, line 19, "to pmember" should be --top member--;
       Column 7, line 31, after "bottom" insert --member--;
       Column 7, line 33, "communication" should be --communicating--;
       Column 7, line 38, before "flat" insert --the--;
       Column 7, line 38, "surfaces" should be --faces--;
       Column 8, line 2, "log-carying" should be --log-carrying--;
       Column 8, line 25, "communication" should be --communicating--; and
       Column 8, line 29, "know" should be --knob--.

Signed and Sealed this

Twelfth Day of July, 1988

*Attest:*

DONALD J. QUIGG

*Attesting Officer*      *Commissioner of Patents and Trademarks*